United States Patent
Oddie

(10) Patent No.: US 7,600,419 B2
(45) Date of Patent: Oct. 13, 2009

(54) WELLBORE PRODUCTION TOOL AND METHOD

(75) Inventor: Gary Martin Oddie, St. Neots (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 151 days.

(21) Appl. No.: 11/608,348

(22) Filed: Dec. 8, 2006

(65) Prior Publication Data

US 2008/0134774 A1 Jun. 12, 2008

(51) Int. Cl.
*E21B 47/10* (2006.01)
(52) U.S. Cl. .................. 73/152.18; 73/152.29
(58) Field of Classification Search .............. 73/152.14, 73/152.18, 152.21, 152.22, 152.29, 152.51, 73/152.54, 152.55; 166/250.1, 252.5, 256
See application file for complete search history.

(56) References Cited

U.S. PATENT DOCUMENTS 4,928,758 A * 5/1990 Siegfried, II ................. 166/66
6,601,461 B2 * 8/2003 Maxit et al. ............... 73/861.79
7,114,386 B1 * 10/2006 Veignat et al. ........... 73/152.29
2006/0157239 A1 * 7/2006 Ramos et al. ............ 166/254.2
2007/0289739 A1 * 12/2007 Cooper et al. .......... 166/250.01

OTHER PUBLICATIONS

Baldauff et al Profiling and quantifying complex multiphase flow Schlumberger Oilfield Review, Autumn 2004, pp. 4-13.

* cited by examiner

*Primary Examiner*—Daniel S Larkin
*Assistant Examiner*—Tamiko D Bellamy
(74) *Attorney, Agent, or Firm*—James McAleenan; Jody Lynn DeStefanis; Dale Guadier

(57) ABSTRACT

A production logging tool for measuring at least one property of a surrounding fluid in a wellbore, comprising a shaft and a rotatable member coupled to the shaft, the rotatable member comprising a sensor component, the arrangement being such that on rotation of the member the sensor moves in a path transverse to the length of the shaft.

11 Claims, 3 Drawing Sheets

WELLBORE PRODUCTION TOOL AND METHOD

BACKGROUND

The invention relates to a wellbore production logging tool, particularly for use in logging the properties of complex, multiphase and stratified flows encountered in such wellbores.

The majority of oil production today is from mature oil fields. Wellbores for producing oil from oil fields generally produce a mixture of oil, gas, water and suspended solids. Often the produced fluid is rich in water, particularly from mature oil fields.

It has long been known that accurate production logging can give precious information about the properties of the fluid in a wellbore. Interpretation of any resulting data can be used to provide information on a wide variety of aspects of the performance of a wellbore.

In particular, it is highly desirable to identify the locations of entry ports for oil, gas and water respectively. Once the location of a major water entry port has been found, say, then remedial operations can be carried out on the wellbore, potentially resulting in significant increases in oil production.

However, in some wellbore environments, particularly those found in highly deviated wellbores, such as complex multiphase and stratified flows, it is difficult or impossible to extract useful logging data with known techniques.

Baldauff et al, "Profiling and Quantifying Complex Multiphase Flow", Oilfield Review, Autumn 2004, pp. 4-13, discloses a wellbore production logging tool which comprises a plurality of spinners, optical and conductivity sensors, which provide detailed information of phase profiles in a wellbore, even in highly stratified flows encountered in horizontal or near-horizontal wells. As with other known devices, the sensors are not mounted for rotation with respect to the shaft.

Whilst such a device can cope with a complex fluid environment, it nevertheless suffers from known production logging problems such as multiple sensor feedthroughs. Furthermore, loggers of this type can give erroneous readings in multiphase flows due to the problem of droplet sticking on the sensors themselves.

There therefore remains a need to provide improved production logging devices and methods.

SUMMARY

In a first aspect, the present invention provides a production logging tool for measuring at least one property of a surrounding fluid in a wellbore, comprising a shaft and a rotatable member coupled to the shaft, the rotatable member comprising a sensor component, the arrangement being such that on rotation of the member the sensor moves in a path transverse to the length of the shaft.

The tool is intended to be passed down into a wellbore, including deviated wellbores, and then to transverse the wellbore to collect production logging data. As wellbore fluid typically flows upwards to the surface, wellbore fluid travels relative to the tool, even the tool is stationary with respect to the wellbore.

In use the sensor can rotate with respect to the shaft and will describe a path, generally a circular path, with respect to the shaft. When there is relative movement between the shaft and the surrounding wellbore fluid, the sensor component can describe a helical path in the fluid.

As the sensor component transcribes a helical path through the fluid, the length of the path traced by the sensor component is considerably greater than the length of the path covered by a sensor component which is not rotated by a rotatable member. Thus, production logging difficulties such as surface wetting issues and droplet sticking are greatly reduced purely because of the increased velocity of the sensor component through the fluid.

Additionally, as a greater cross-sectional area of the wellbore is covered by the sensor component, an improved measurement of the local fluid properties can be obtained.

Alternatively, fewer sensors may be required for a given task, giving significant improvement to the problem of multiple data feedthroughs.

The present invention is particularly advantageous in wellbores which contain stratified, multiphase flows (e.g. gas, oil and water flows), particularly found in deviated wellbores, since rotating sensor components on the rotatable members can scan the fluid properties over an area equal to that of the sensor trajectory, rather than just making a point measurement.

Thus, in a second aspect, the invention provides a method for carrying out production logging in a wellbore which comprises multiphase fluids, the method comprising traversing the wellbore with a logging tool as herein defined and collecting logged data for analysis.

Conveniently the tool comprises an encoding means which ensures that the rotation of the rotatable member is encoded relative to the tool. This enables the spatial location of the sensor component to be determined, which in turn enables a spatial map of fluid properties to be generated.

The sensor component is generally mounted for rotation about an axis parallel to or aligned with the length of the shaft so that, in use, as the tool is fed into a wellbore, the sensor component rotates on an axis parallel to the path of the wellbore. The axis of rotation may be inclined with respect to the shaft provided the sensor component rotates in a path transverse to the length of the shaft, i.e. not at 90° to the shaft. A large angle of inclination with respect to the shaft is undesirable as it minimises the benefits of the helical path. Thus, the angle of inclination is preferably less than 30°.

Typically the rotatable member is freely rotatable in response to local fluid drag and is not independently driven. The rotatable member may comprise a plurality of rotatable blades, angled for rotation in response to local fluid drag resembling an aeroplane propeller. Conveniently the rotatable member comprises a plurality of symmetrically arranged blades fixedly mounted on a hub for rotation in an arrangement commonly referred to in the art as a "spinner".

The rotatable member may be mounted directly onto the shaft for rotation with respect thereto. However, preferably it is mounted on a side arm which is fixed to the shaft, and mounted for rotation with respect to the side arm.

If information is measured by a sensor component associated with the rotatable member, then that information typically needs to be transmitted to the tool itself. This may conveniently be carried out by use of an inductive coupling (e.g. a zero friction and zero contact inductive coupling).

Another possibility is to transmit a produced signal via modulation of an existing magnetic pickup, which is conventionally used for determining the rotational velocity of the rotatable member. Optical methods may also be possible, however these may not be preferred due to the need for a coupling medium or at least a sliding contact (which may be undesirable in a downhole environment) to keep any wellbore fluids out of the signal path.

It may be preferable to have more than one sensor component on the rotatable member, possibly with more than one sensor component on a single blade of the rotatable member.

In this way a larger cross-section of the wellbore can be traversed. In this arrangement, it may be desirable for all or some of the measured signals or some averaged value, to be fed back to the tool body for subsequent signal processing. Thus it is preferable for the rotatable member to comprise a signal processing means, to reduce the bandwidth of any data which is to be transmitted from the rotatable member to the tool itself.

The sensor component is a component involved in a process of measuring a property of the surrounding fluid. Non-limiting examples of measurable properties of the surrounding fluid are fluid type, chemical composition, fluorescence, conductivity, refractive index, viscosity, passage of interfaces, droplets, waves, temperature and pressure. However velocity is not considered to be a property of the fluid.

The sensor component may be any measurement device suitable for use in a production logging tool, such as an electrical probe or an optical probe. Alternatively, the sensor component can emit information which is received by a sensor possibly remote from the rotatable member. For example, the sensor component may comprise a light emission means so that light is emitted from the rotatable member causing any surrounding oil to fluoresce. Any resulting back scattered light can then be collected in a convenient location, not necessarily on the rotatable member itself.

In another arrangement, the rotatable member may comprise an electrode in a DC circuit, measuring resistance or capacitance as appropriate. In this arrangement, another electrode may be positioned on the rotatable member, thus measuring local conductivity or capacitance across a region of the wellbore.

The logging tool may comprise a single rotatable member or may comprise a plurality of rotatable members, each having at least one sensor component. Thus in one arrangement, the tool may comprise an array of small rotatable members, each providing information about their particular region of the wellbore. In a preferred embodiment the tool comprises an array of small rotatable members radially spaced apart so that when the tool enters a wellbore each rotatable member can provide information specific to their respective location in the cross-section of the wellbore. This arrangement is particularly advantageous in highly stratified flow regimes.

Alternatively, the tool may comprise a large rotatable member, which is intended to sweep across substantially the whole cross-section of the wellbore. Combining a plurality of small rotatable members and one or more large rotatable members can provide a sensor arrangement having the advantages associated with both small and larger rotatable members.

The data collected by the logging tool may be stored on the logging tool in memory, or, more typically, is transmitted upwards to the surface for collection. Once the data has been collected it is interpreted to produce useful interpreted data regarding the properties of the fluid in the wellbore.

Conveniently the interpreted data is used to produce a description of the fluid properties, e.g. a pictorial representation, in the wellbore. This then enables a suitably skilled person to make a decision based on the representation as to e.g. the location of water entry points. Remedial action can then take place in the wellbore, e.g. by blocking off the water entry point, potentially leading to an increase in oil production. Interpretation, generating a representation and making such decisions may be carried out at a location remote from the wellbore.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

DETAILED DESCRIPTION AND EXAMPLES

Figure 1:
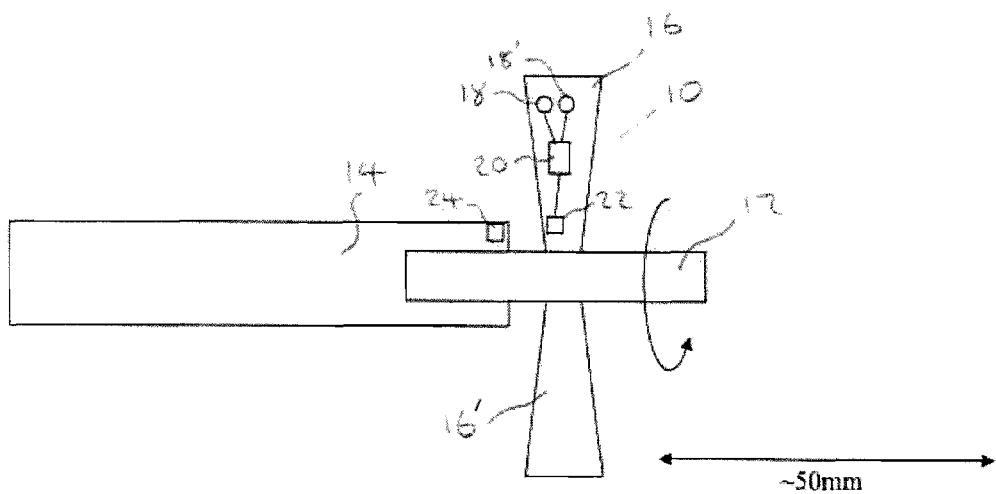
FIG. 1 is a schematic representation of a rotatable member according to the invention mounted on a shaft comprising an electrical sensor.

FIG. 1 shows a spinner 10 comprising a hub 12 and blades 16, 16', which is connected to a shaft of the tool 14. The spinner 10 is freely rotatable in a plane perpendicular to the axis of the hub. One of the blades 16 comprises two conductivity probe electrodes 18, 18' which are each connected to signal processing unit 20 which is itself connected to inductive coupling transmitter 22. An inductive coupling receiver 24 is mounted on the shaft and transmits the received signal through the shaft of the tool to be processed at a separate location.

In use, the logging tool is introduced into a wellbore, and the spinner begins to rotate in response to the dynamic fluid forces on the blades 16, 16'. As the blades 16, 16' rotate, so the conductivity probe electrodes 18, 18' transcribe a helical path through the surrounding fluid. The measurements of conductivity from the probes 18, 18' are fed to signal processing unit 20, where they are averaged. The averaged signal is transmitted to the inductive coupling transmitter 22 which in turn transmits the signal to inductive coupling receiver 24, which in turn transmits its signal through the logging tool up to the surface for interpretation purposes.

Figure 2:
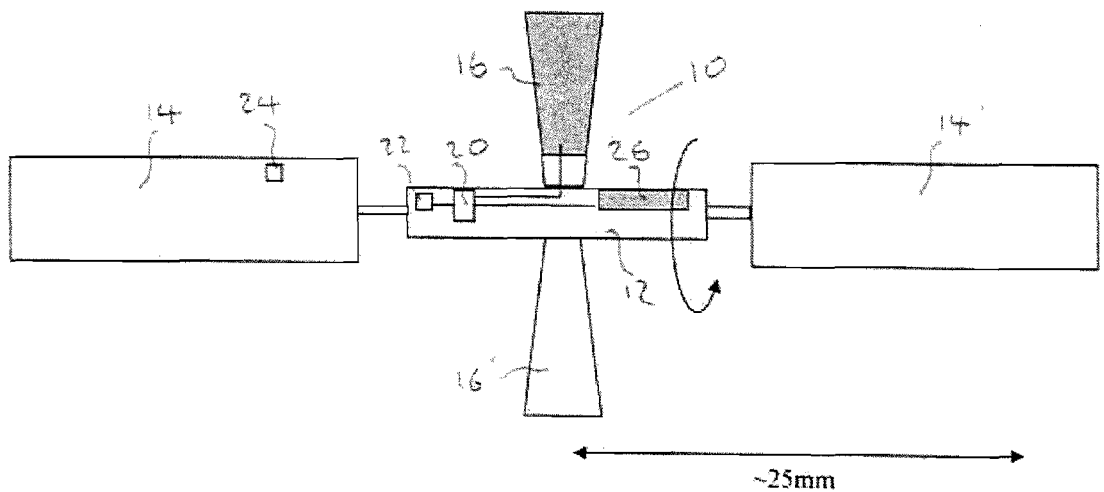
FIG. 2 is a schematic representation of a rotatable member according to the invention mounted on a shaft, wherein one of the blades is an electrode.

FIG. 2 shows an arrangement similar to that shown in FIG. 1, showing a spinner 10 mounted for rotation on shaft 14, 14'. In this case, one of the blades 16, 16' is itself an electrode. The second electrode 26 is mounted on the hub. Blade 16 and electrode 26 are electrically connected to signal processing unit 20 which is itself connected to inductive coupling transmitter 22. Inductive coupling receiver 24 is mounted on the shaft.

In use, the spinner rotates in response to dynamic fluid forces on the blades 16, 16'. The electrical impedance between the two electrodes is measured and transmitted to signal processing unit 20. Thus, the electrical impedance of a helical tube through the fluid, is measured. The measured signal is transmitted to inductive coupling receiver 24 which in turn transmits its signal through the tool body and upwards towards the surface for signal processing.

Figure 3:
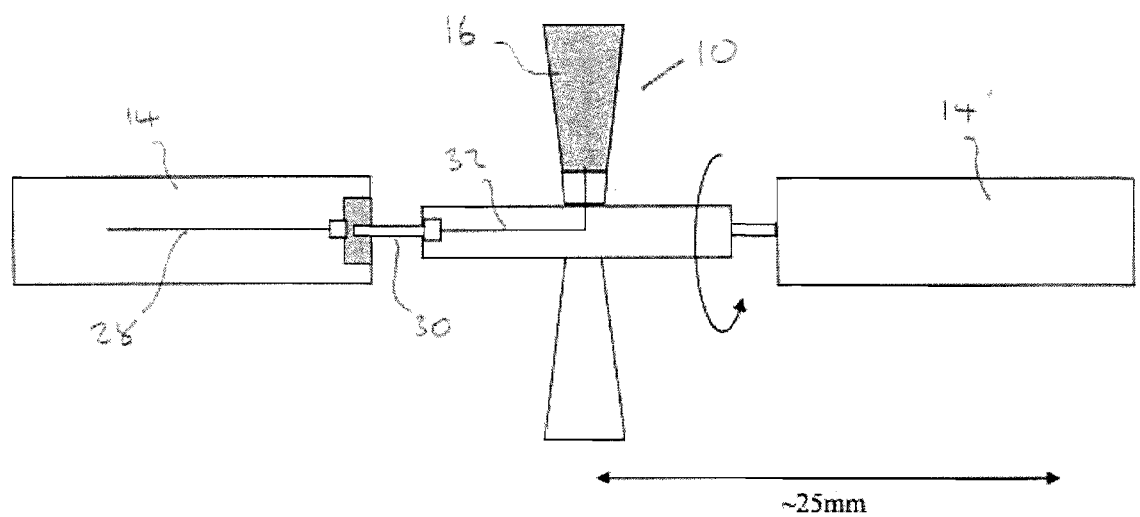
FIG. 3 is a schematic representation of a rotatable member according to the invention mounted on a shaft wherein one of the blades comprises a light guide which illuminates a blade of the spinner.

FIG. 3 shows a similar arrangement to that shown in FIG. 2, showing a rotatable spinner connected to a tool body. The tool body 14, 14' comprises an optical guide 28 which passes through a sapphire bearing and optical coupling 30 and is optically connected to a light guide 32 which itself passes into one of the blades 16.

As described above, in use, the spinner rotates in response to dynamic fluid forces from the surrounding fluid. Light is passed through optical guide 28, which passes through light guide 32 and into blade 16. The blade 16 "glows" into the surrounding fluid. If the surrounding fluid fluoresces (indicating the presence of oil) then the back scattered light is collected by a receptor on the blade (not shown) and received data transmitted back through the hub to be analyzed.

Figure 4:
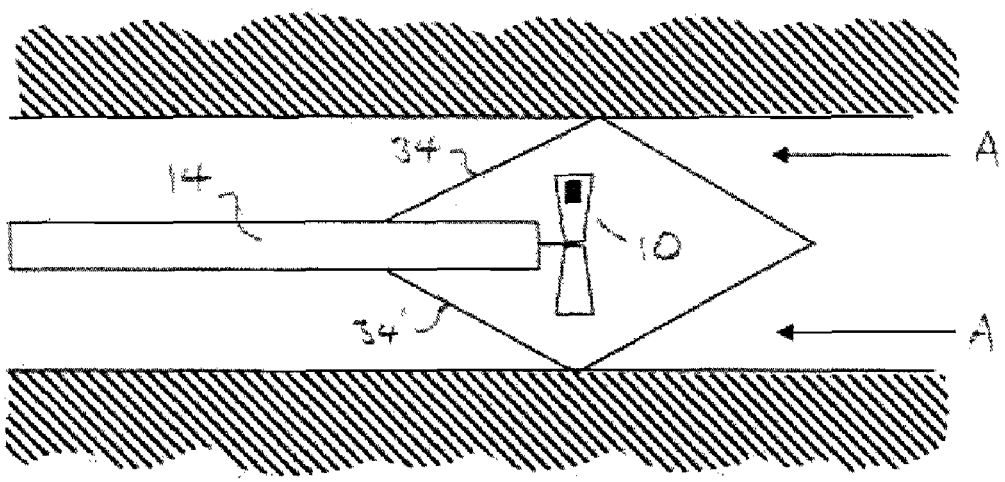
FIG. 4 is a schematic representation of a rotatable member according to the invention mounted on a shaft in a wellbore containing flowing fluid.

FIG. 4 shows a tool with the spinner 10 of FIG. 1 mounted on a shaft 14. The shaft comprises collapsible centralizers 34, 34'. Fluid flows in the direction of arrows A and the resulting dynamic fluid forces acting on the spinner 10 cause it to rotate as discussed above.

In use, fluid flows in the direction of arrows B and C. Fluid B represents an upper stratified flow of oil and C represents a lower stratified flow of water. The fluid velocities of the oil and water are significantly different to each other. As the spinners 10 are radially spaced apart, useful information regarding the stratified flow can be obtained which would not be obtainable with the arrangement of FIG. 4.

Figure 5:
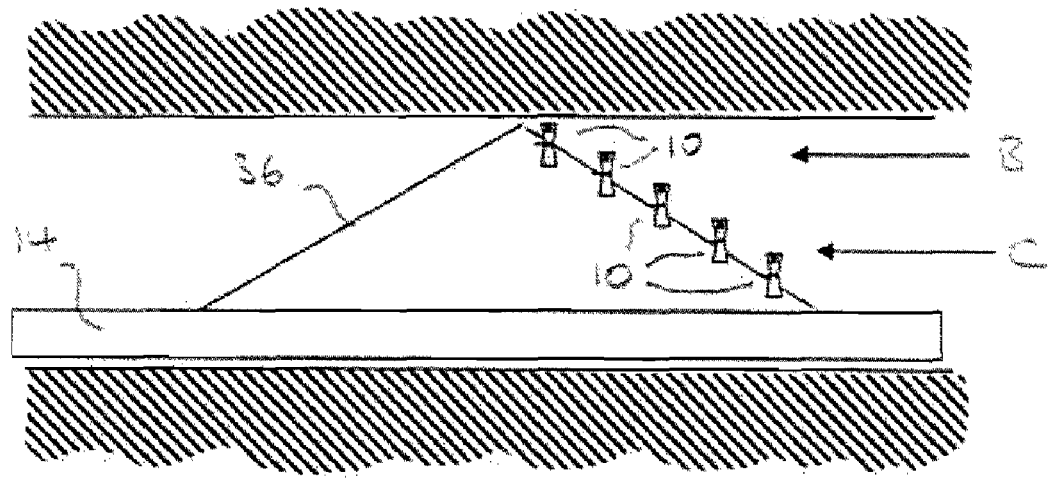
FIG. 5 is a schematic representation of a plurality of rotatable members according to the invention mounted on an arm of a tool in a wellbore containing flowing fluid.

FIG. 5 shows a tool with a shaft 14 and a collapsible side arm 36. The collapsible arm has a plurality of spinners 10 of FIG. 1 mounted thereon radially spaced apart for rotation with respect to the side arm.

While the principles of the disclosure have been described above in connection with specific apparatuses and methods, it is to be clearly understood that this description is made only by way of example and not as limitation on the scope of the disclosure.

What is claimed is:

1. A production logging tool for measuring at least one property of a surrounding fluid in a wellbore, comprising a shaft and a rotatable member coupled to the shaft, the rotatable member comprising a sensor component to measure a property of the surrounding fluid, wherein the rotatable member and the sensor component are configured to contact the surrounding fluid, such that rotation of the member moves the sensor component through the surrounding fluid in a path transverse to the length of the shaft.

2. A logging tool according to claim 1, which comprises an encoder for encoding the orientation of the rotatable member.

3. A logging tool according to claim 1, wherein the rotatable member comprises a plurality of blades.

4. A logging tool according to claim 3, wherein the rotatable member is a spinner.

5. A logging tool according to claim 1, wherein the rotatable member comprises a plurality of sensor components.

6. A logging tool according to claim 1, which comprises a plurality of rotatable members comprising at least one sensor component.

7. A logging tool according to any one preceding claim, wherein the rotatable member also comprises a signal processing device.

8. A logging tool according to claim 1, wherein the sensor component emits information.

9. A logging tool according to claim 1, wherein the tool comprises an inductive coupling.

10. A method of carrying out production logging in a wellbore which comprises multiphase fluids, the method comprising traversing the wellbore with a logging tool said tool comprising a shaft and a rotatable member coupled to the shaft, the rotatable member comprising a sensor component, wherein the rotatable member and the sensor component contact the surrounding fluid, the arrangement being such that rotation of the member moves the sensor component through the surrounding fluid in a path transverse to the length of the shaft, and using the sensor component to measure data regarding one or more properties of the multiphase fluids.

11. A method of analysing data as measured according to claim 10, comprising receiving measured data, interpreting said data, and using said interpreted data to produce a description of the fluid properties in the wellbore.

\* \* \* \* \*